United States Patent
Luo et al.

(10) Patent No.: US 7,969,559 B2
(45) Date of Patent: Jun. 28, 2011

(54) LASER DISTANCE MEASURING APPARATUS AND CONTROL METHOD THEREOF

(75) Inventors: Yin-Long Luo, Hang-Zhou (CN); Tsung-Yueh Tsai, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 99 days.

(21) Appl. No.: 12/575,569

(22) Filed: Oct. 8, 2009

(65) Prior Publication Data
US 2010/0157281 A1 Jun. 24, 2010

(30) Foreign Application Priority Data
Dec. 22, 2008 (TW) ............................. 97150078 A

(51) Int. Cl.
*G01C 3/08* (2006.01)
(52) U.S. Cl. ...................................... 356/5.1; 356/5.15
(58) Field of Classification Search ................. 356/4.01, 356/5.01, 5.15
See application file for complete search history.

(56) References Cited

U.S. PATENT DOCUMENTS

| | | | | |
|---|---|---|---|---|
| 5,815,251 A * | 9/1998 | Ehbets et al. | ................ | 356/5.01 |
| 7,471,377 B2 | 12/2008 | Liu et al. | | |
| 7,738,083 B2 * | 6/2010 | Luo et al. | .................... | 356/5.15 |
| 2005/0151957 A1 * | 7/2005 | Stierle et al. | ................ | 356/5.15 |
| 2007/0236679 A1 * | 10/2007 | Luo et al. | .................... | 356/4.01 |
| 2009/0141001 A1 * | 6/2009 | Kuroda et al. | ................ | 345/175 |

* cited by examiner

*Primary Examiner* — Isam Alsomiri
(74) *Attorney, Agent, or Firm* — Thomas | Kayden

(57) ABSTRACT

A laser distance measuring apparatus and control method thereof includes an emitter, a first and second liquid crystal display module, a receiver, a condensing lens, and a control unit. The emitter emits measuring light. The control unit sets the first liquid crystal display module to a second state and the second liquid crystal display module to a first state to receive the reflected light. When the reflected light is larger than a predetermined value, the control unit adjusts a transmittance of the first liquid crystal display module until the reflected light is lower than the predetermined value, and calculates a distance value based on phase difference between the reference light and the reflected light.

18 Claims, 4 Drawing Sheets

LASER DISTANCE MEASURING APPARATUS AND CONTROL METHOD THEREOF

CROSS REFERENCE TO RELATED APPLICATIONS

This Application claims priority of Taiwan Patent Application No. 97150078, filed on Dec. 22, 2008, the entirety of which is incorporated by reference herein.

BACKGROUND OF THE INVENTION

1. Field of the Invention

The present invention relates to a laser distance measuring apparatus, and more particularly, to a laser distance measuring apparatus utilizing a liquid display module for distance measurement.

2. Description of the Related Art

A laser scale is used to set a shutter device for maintaining phase difference accuracy between a measuring light and the reference light for laser distance measuring. For example, U.S. Pat. No. 7,471,377B2 discloses a measuring system which comprises a shutter device for shielding interference generated during measuring light emitted is set in a light path passed by the reference light. Additionally, the shutter device is utilized to shield undesired light which is the measuring light reflected to the path of the reference light, to avoid interference of the undesired light received by a receiver from decreasing accuracy of a measured result. However, utilizing the shutter device consumes more power because the shutter device needs a certain amount of current for actuation. Moreover, the shutter device generates vibration and noise during operation. In addition, when a target is a substance with high reflectivity or within a short distance, intensity of measured signal reflected from the target will be very large to over an acceptable range, thus es a saturated electronic signal will be outputted from receiver, and thereby making the laser scale unable to calculate a distance by the electronic signal.

BRIEF SUMMARY OF THE INVENTION

Therefore, in order to improve shortcomings as mentioned previously, the present invention provides a laser distance measuring apparatus with low noise, low power consumption, and increasing measurement ability.

The present invention provides a laser distance measuring apparatus for measuring a distance from a target. The laser distance measuring apparatus includes an emitter for emitting a measuring light to the target, a first liquid crystal display module including a second state and a first state, a second liquid crystal display module including a second state and a first state, a receiver for receiving a reference light passing through the second liquid crystal display module by the measuring light, and a reflected light reflected from the target by the measuring light. Additionally, a reference signal and a reflected signal is outputted based on intensity of the reference light and the reflected light. Also, a control unit for setting the first liquid crystal display module to a first state and the second liquid crystal display module to a second state in order to receive the reference signal when the emitter emits the measuring light, and setting the first liquid crystal display module to a second state and the second liquid crystal display module to a first state for the receiver receiving the reflected signal is provided. The reflected signal and a predetermined value are compared. A transmittance of the first liquid crystal display module is adjusted until the reflected signal is lower than the predetermined value when the reflected signal is larger than the predetermined value. A distance value is calculated based on phase difference between the reference light and the reflected light.

The present invention further provides a method for controlling a laser distance measuring apparatus, which includes setting a first liquid crystal display module to a first state, and a second liquid crystal display module to a second state, receiving the reference light passing through the second liquid crystal display module by a measuring light, setting the first liquid crystal display module to a second state and the second liquid crystal display module to a first state after the reference light is received, receiving the reflected light reflected from the target by the measuring light, and comparing whether an intensity of the reflected light is larger than a predetermined value. A distance value is calculated based on phase difference between the reference light and the reflected light if the intensity of the reflected light is lower than the predetermined value. The transmittance of the first liquid crystal display module is lowered until the intensity of the reflected light is lower than the predetermined value if the intensity of the reflected light is larger than the predetermined value, to calculate the distance value based on phase difference between the reference light and the reflected light.

These and other objectives of the present invention will become obvious to those of ordinary skill in the art after reading the following detailed description of the preferred embodiments that are illustrated in the various figures and drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
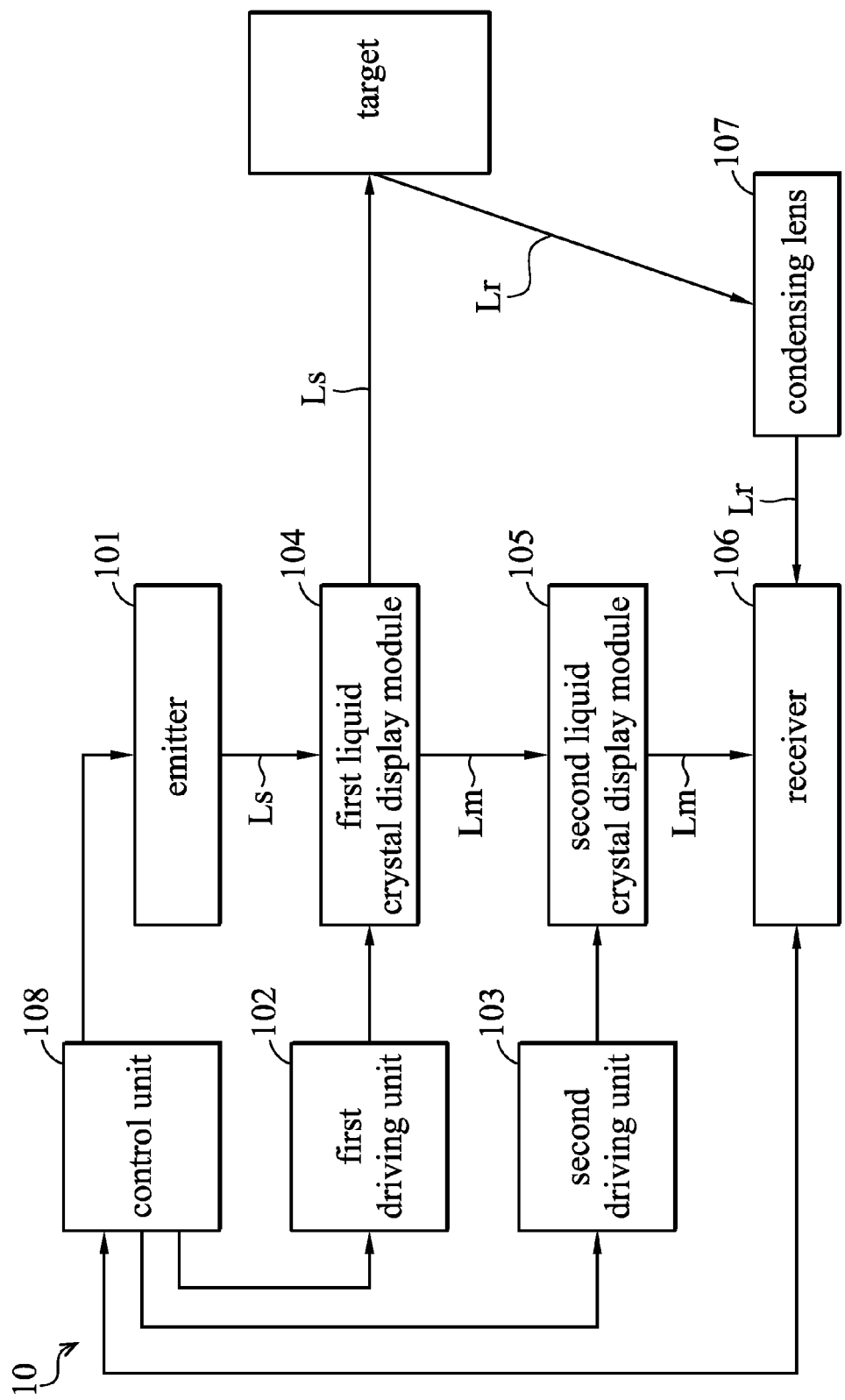
FIG. 1 is a block diagram of a laser distance measuring apparatus according to an embodiment of the present invention.

Please refer to FIG. 1, which is a block diagram of a laser distance measuring apparatus according to an embodiment of the present invention. The laser distance measuring apparatus 10 includes an emitter 101, a first driving unit 102, a second driving unit 103, a first liquid crystal display module 104, a second liquid crystal display module 105, a receiver 106, a condensing lens 107, and a control unit 108.

In FIG. 1, the emitter 101 is utilized to generate the modulated measuring light Ls. More specifically, the control unit 108 controls the emitter 101 to emit the measuring light Ls with phase-modulated to a target when the laser distance measuring apparatus 10 performs measurement. The measuring light Ls passing through the first liquid crystal display module 104 becomes the reference light Lm reflected by the first liquid crystal display module 104 if the first liquid crystal display module 104 is in a first state. Otherwise, the measuring light Ls passing through the first liquid crystal display module 104 reaches to the target if the first liquid crystal display module 104 is in a second state. The emitter 101 is a laser module in the embodiment of the present invention. It is note that the first state is a non-transparant state, and the second state is a transparent state.

The first driving unit 102 and the second driving unit 103 is respectively utilized to set a second state and a transmittance of the first liquid crystal display module 104 and the second liquid crystal display module 105. The first and second driving units are liquid crystal display driving circuits in the embodiment of the present invention.

The first liquid crystal display module 104 includes a second state and a first state, wherein an angle is between the first liquid crystal display module 104 and a direction of the measuring light Ls. Specifically, the first liquid crystal display module 104 is set to a second state or the first state by the first driving unit 102, to control whether the measuring light Ls passes through or is blocked by the first liquid crystal display module 104 and control whether reflected light is reflected by the target. In addition, since an inclination of an angle is between the first liquid crystal display module 104 and a path of the measuring light Ls, the first liquid crystal display module 104 reflects the measuring light Ls to the second liquid crystal display module 105, wherein the angle is decided by a relative position of the emitter 101, the first liquid crystal display module 104, and the receiver 106. In the present embodiment of the invention, the first liquid crystal display module 104 is a twisted-nematic liquid crystal display (TN-LCD) or a super twisted-nematic liquid crystal display (STN-LCD).

The second liquid crystal display module 105 includes a second state and a first state, to control whether the reference light Lm passes through to reach the receiver 106 or is blocked. Specifically, the measuring light Ls is reflected to become the reference light Lm when the first liquid crystal display module 104 is in the first state, and the reference light Lm passing through the second liquid crystal display module 105 reaches the receiver 106 when the second liquid crystal display module 105 is in the second state. However, even if the first liquid crystal display module 104 is in the second state, the receiver 106 still receives a little reflected light because of the reflections of the passed measuring light Ls, which causes interference. Therefore, the second liquid crystal display module 105 can block the interference which is generated by the reflections of the measuring light Lm when the first liquid crystal display module 104 is in the second state. Namely, during reception of the reflected light Lr, the second liquid crystal display module 105 blocks lights reflected by the first liquid crystal display module 104. In the embodiment of the present invention, the second liquid crystal display module 105 is a twisted-nematic liquid crystal display (TN-LCD) or a super twisted-nematic liquid crystal display (STN-LCD).

The receiver 106 is utilized to receive the reference light Lm passing through the second liquid crystal display module 105 by the measuring light Ls, and the reflected light Lr reflected from the target by the measuring light Ls, and outputs a reference signal and a reflected signal based on intensity of the reference light Lm and the reflected light Lr. The receiver 106 is set in a route of the reference light Lm and a route of the reflected light Lr, when the first liquid crystal display module 104 is in the first state, the measuring light Ls emitted from the emitter 101 and encountering the first liquid crystal display module 104 is reflected to the second liquid crystal display module 105 because of the first state of the first liquid crystal display module 104, and when the second liquid crystal display module 105 is in the second state, the measuring light Ls passing through the second liquid crystal display module 105 can reach the receiver 106 and becomes the reference light Lm. After the receiver 106 receives the reference light Lm, the receiver 106 generates the reference signal corresponding to the light intensity of the reference light Lm. Similarly, when the first liquid crystal display module 104 is in the second state, the measuring light Ls emitted from the emitter 101 and passing through the first liquid crystal display module 104 reaches the target because of the second state of the first liquid crystal display module 104. The measuring light Ls encounters the target and is reflected by the target to become the reflected light Lr. Then, the reflected light Lr is condensed to the receiver 106 via the condensing lens 107, and after the receiver 106 receives the reflected light Lr, the receiver 106 outputs the reflected signal based on the light intensity of the reflected light Lr, wherein a level of the signal changes according to a level of the light intensity of the reference light Lm, and the signal generates signal with phase change according to phase change of the lights. In the embodiment of the present invention, the receiver 106 is an avalanche photodiode (APD).

The condensing lens 107 is utilized for condensing the reflected light Lr to the receiver 106. When the reflected light Lr is reflected by a distant target, the condensing lens 107 condenses the parallel reflected light Lr to the receiver 106, so that the receiver 106 can receive the reflected light Lr which is reflected by a target at a long distance. The condensing lens 107 is a convex lens in the embodiment of the present invention, and is an aspheric lens in another embodiment of the present invention. Note that, the condensing lens 107 can be a simple lens or a combined lens. In addition, the condensing lens 107 is a lens module in another embodiment of the present invention.

The control unit 108 is utilized for setting the first liquid crystal display module 104 to a first state and the second liquid crystal display module 105 to a second state, so that the receiver 106 may receive the reference signal when the emitter 101 emits the measuring light Ls. Then, the control unit 108 sets the first liquid crystal display module 104 to a second state and the second liquid crystal display module 105 to a first state, to receive the reflected signal, compares the reflected signal and a predetermined value, and adjusts the transmittance of the liquid crystal display module 104 until the reflected signal is lower than the predetermined value when the reflected signal is larger than the predetermined value. Next, the receiver 106 receives the reference light Lm and the reflected light Lr again, and the control unit 108 calculates a distance value based on the phase difference of the reference light Lm and the reflected light Lr. The control unit 108 is a microcontroller unit (MCU) in the embodiment of the present invention, and is a complex programmable logic device (CPLD), or a filed programmable gate array (FPGA) in another embodiment of the present invention.

Figure 2:
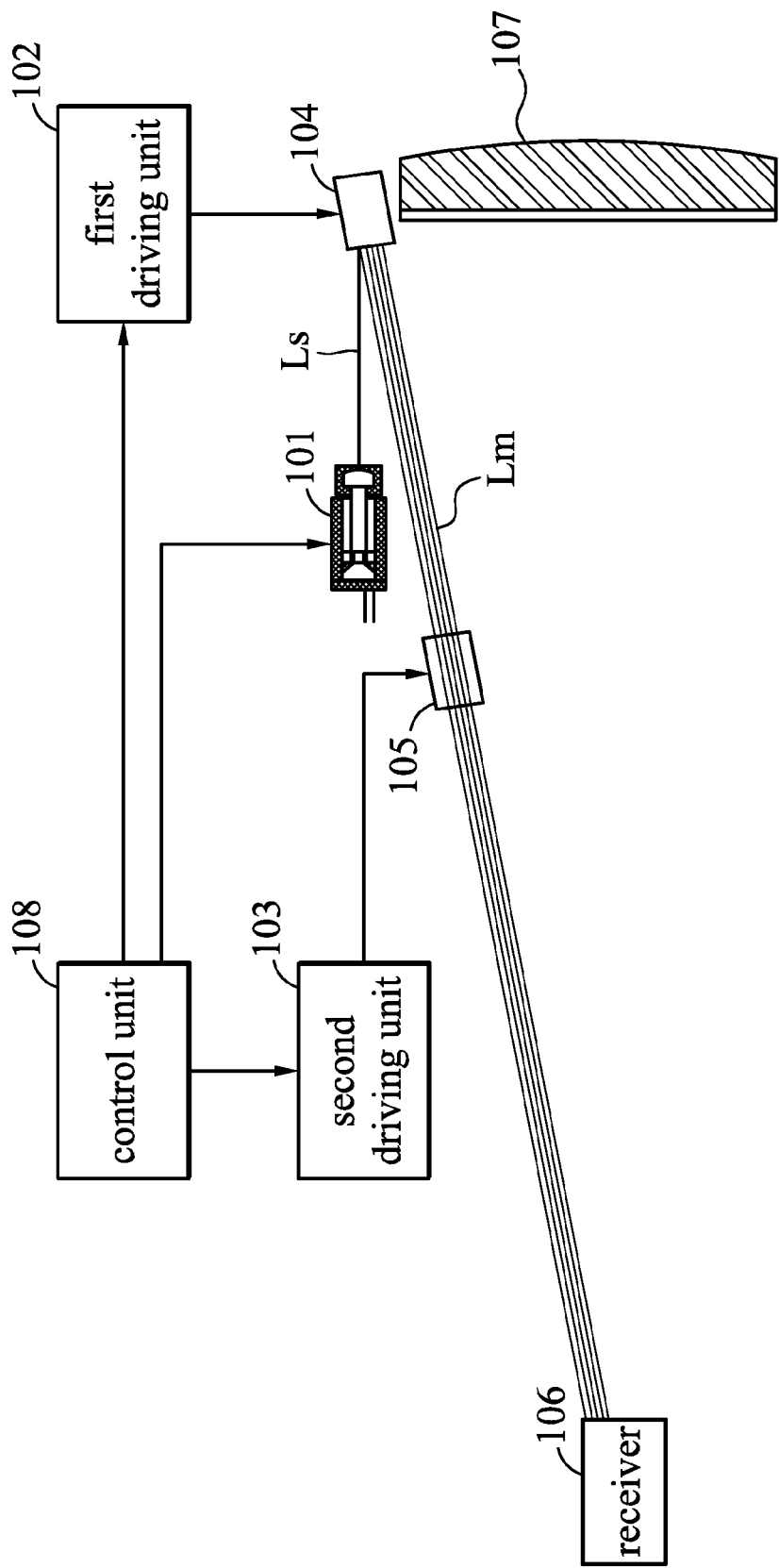
FIG. 2 is a schematic diagram of an operation of a laser distance measuring apparatus receiving the reference light according to an embodiment of the present invention.

An operation of the laser distance measuring apparatus 10 performing measurement is illustrated as follows. Please refer to FIGS. 2 and 3, which are respectively a schematic diagrams of an operation of the laser distance measuring apparatus 10 receiving the reference light Lm and a reflected light Lr according to embodiments of the present invention. As shown in FIG. 2, the control unit 108 controls the emitter 101 to emit the modulated measuring light Ls, so that the measuring light Ls has a continuous phase change when the laser distance measuring apparatus 10 is triggered to perform distance measurement from the target. For example, the measuring light Ls is modulated to a sine wave with a frequency, and thereby the phase of the measuring light Ls continuously changes in a period of the sine wave.

Meanwhile, the control unit 108 controls the driving unit 102 and 103, to set the first liquid crystal display module 104 to a first state and the second liquid crystal display module 105 to a second state. Therefore, when the measuring light Ls reaches the first liquid crystal display module 104, the measuring light Ls is reflected to the receiver 106 because an angle is formed between the first liquid crystal display module 104 and a direction of the measuring light Ls, so as to generate the reference signal, and input into the control unit 108.

Figure 3:
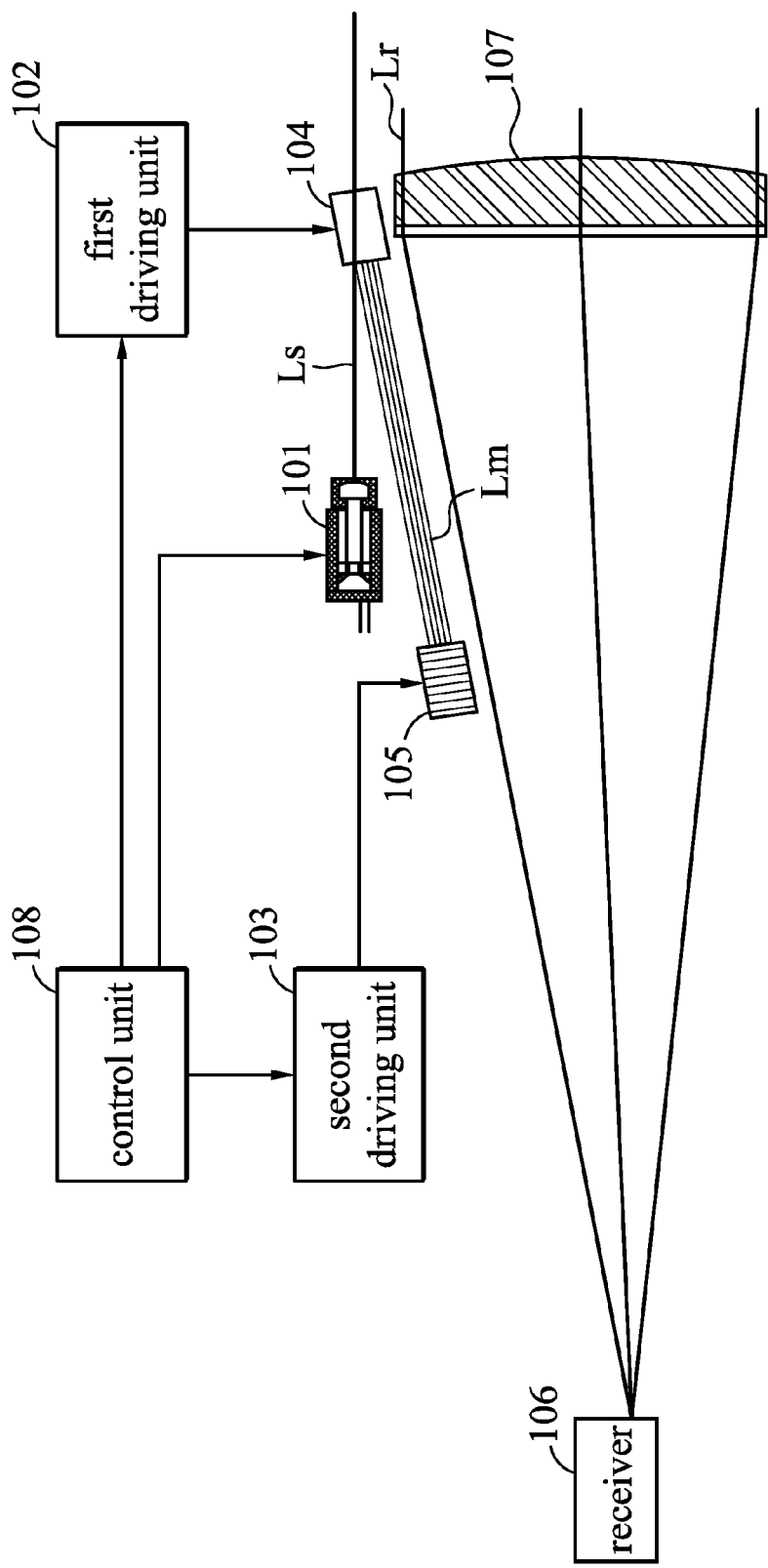
FIG. 3 is a schematic diagram of an operation of a laser distance measuring apparatus receiving the reflected light according to an embodiment of the present invention.

After, please refer to FIG. 3. The control unit 108 controls the driving unit 102 and 103, to set the first liquid crystal display module 104 to a second state and the second liquid crystal display module 105 to a first state. Therefore, the measuring light Ls passing through the first liquid crystal display module 104 reaches the target, and the reflected light Lr reflected by the target is condensed to the receiver 106 via the condensing lens 107. Since the second liquid crystal display module 105 is in the first state, some of the reflected light Lr generated during the measuring light Ls passing through the first liquid crystal display module 104 can be blocked, so that the receiver 106 does not receive interference affecting the measurement result.

After the receiver 106 receives the reflected light Lr, the receiver 106 outputs the reflected signal to the control unit 108. The control unit 108 compares the reflected signal and a predetermined value, and calculates a distance value from the target based on phase difference of the received reference signal and the reflected signal if the reflected signal is lower than the predetermined value. Moreover, if the reflected signal is larger than the predetermined value, the control unit 108 controls the first driving unit 102, to decrease the transmittance of the first liquid crystal display module 104 and a value of the reflected signal until the reflected signal is lower than the predetermined value. Then, the control unit 108 re-controls the second state of the first liquid crystal display module 104 and the second liquid crystal display module 105, to receive the reference signal and the reflected signal again, and calculates the distance from the target via the phase difference of the received reference signal and the reflected signal.

Figure 4:
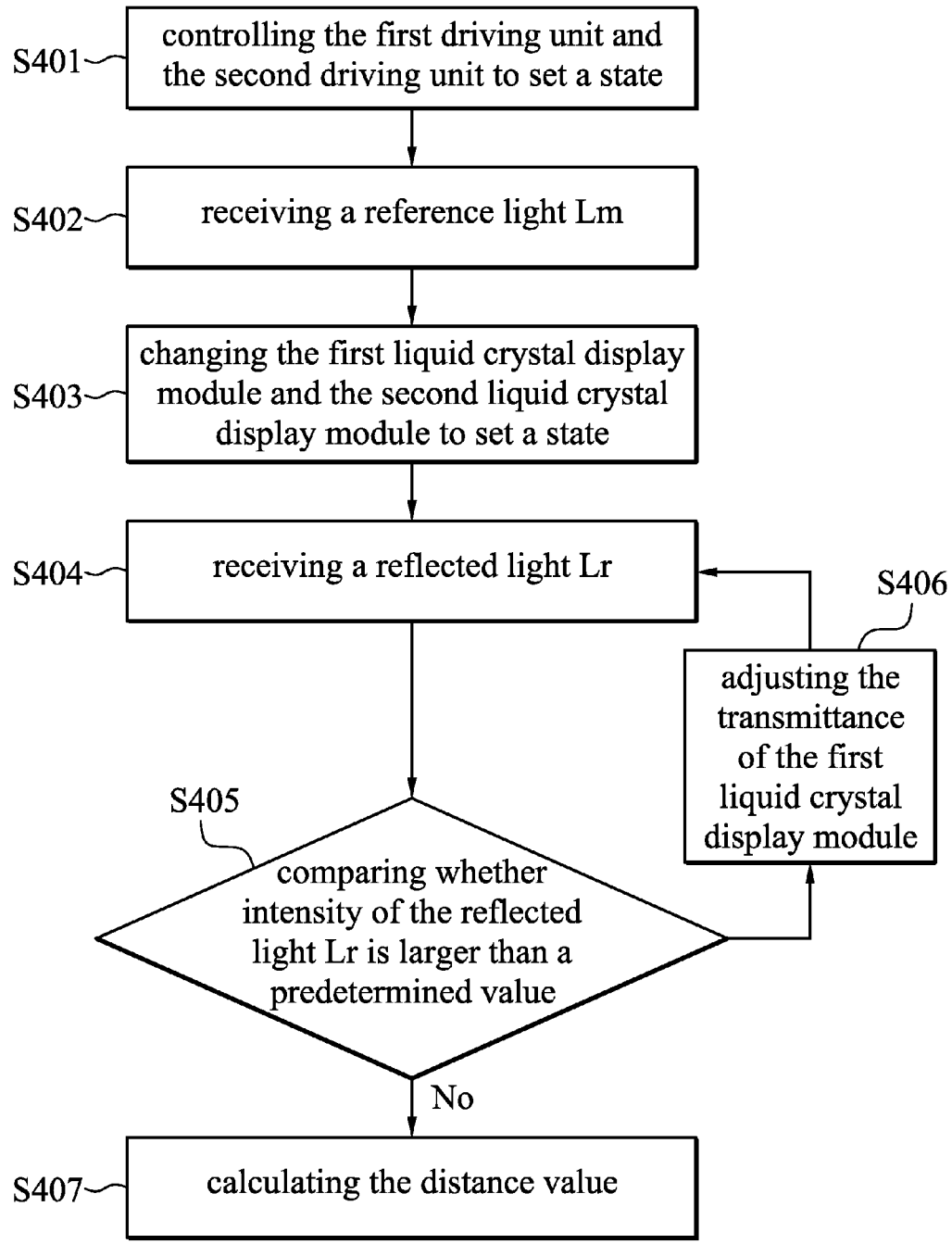
FIG. 4 is a flowchart diagram of a method for controlling a laser distance measuring apparatus according to an embodiment of the present invention.

A method for controlling the laser distance measuring apparatus is illustrated as follows. Please refer to FIG. 4, which is a flowchart diagram of the method for controlling the laser distance measuring apparatus 10 according to an embodiment of the present invention, which is utilized for measuring a distance from a target. The laser distance measuring apparatus 10 includes an emitter 101, a first driving unit 102, a second driving unit 103, a first liquid crystal display module 104, a second liquid crystal display module 105, a receiver 106, a condensing lens 107, and a control unit 108, and emits a modulated measuring light to the target when the laser distance measuring apparatus 10 performs measurement. The method includes the following steps:

Step 1: The first liquid crystal display module 104 is set at a first state, and the second liquid crystal display module 105 is set at a second state. For step S401, the control unit 108 controls the first driving unit 102 to set the first liquid crystal display module 104 to a first state, and controls the second driving unit 103 to set the second liquid crystal display module 105 to a second state, so that the measuring light Ls can be reflected by the first liquid crystal display module 104 to pass through the second liquid crystal display module 105.

Step 2: The reference light Lm passing through the second liquid crystal display module 105 by the measuring light Ls is received. For step 402, the receiver 106 receives the reference light Lm, and correspondingly outputs a reference signal based on the light intensity of the reference light Lm, wherein the reference signal is a modulated signal corresponding to the reference light Lm, such as a signal of a sine wave.

Step 3: The first liquid crystal display module 104 is set to a second state and the second liquid crystal display module 105 is set to a first state after the reference light Lm is received. For step 403, after the receiver 106 receives the reference light Lm, the control unit 108 controls the first driving unit 102 to set the first liquid crystal display module 104 to a second state, and controls the second driving unit 103 to set the second liquid crystal display module 105 to a first state, so that the measuring light Ls passing through the first liquid crystal display module 104 can reach the target. Moreover, since the second liquid crystal display module 105 is in the first state, some of the reflected light generated by the measuring light Ls passing through the first liquid crystal display module 104 is blocked by the second liquid crystal display module 105.

Step 4: The reflected light Lr reflected from the target by the measuring light Ls is received. For step S404, the reflected light Lr is condensed to the receiver 106 by the condensing lens 107, and the receiver 106 receives the reflected light Lr to generate a reflected signal to be input to the control unit 108.

Step 5: Whether intensity of the reflected light Lr is larger than a predetermined value is determined. If the intensity of the reflected light Lr is lower than the predetermined value, the control unit 108 calculates a distance value based on the phase difference of the received reference light Lm and a reflected light Lr and if the intensity of the reflected light Lr is larger than the predetermined value, the control unit 108 decreases a transmittance of the first liquid crystal display module 104 until the intensity of the reflected light Lr is lower than the predetermined value, and calculates the distance value from the target based on the phase difference of the reference light Lm and a reflected light Lr. For step S405, S406, and S407, when the control unit 108 receives the reflected signal, the control unit 108 compares the reflected signal and the predetermined value, to determine whether the reflected signal is larger than the predetermined value (Step S405). If the reflected signal is lower than the predetermined value, which indicates the intensity of the reflected light Lr is appropriate, the control unit 108 calculates the distance value based on the phase difference of the reference signal and reflected signal (Step 407). On the contrary, if the reflected signal is larger than the predetermined value, which indicates the intensity of the reflected light Lr received by the receiver 106 is too strong and may cause the reflected signal generated by the receiver 106 to be saturated, the control unit 108 controls the first driving unit 102 to decrease the transmittance of the first liquid crystal display module 104 (Step 406) until the reflected signal is lower than the predetermined value, and calculates the distance value from the target based on the phase difference of the reference signal and reflected signal.

Please note that, step 1 and step 3 can be switched, and step 2 and step 4 can be switched, wherein the distance value from the target will still be calculated.

The present invention utilizes the second state and the first state for an optical switch valve, to control the liquid crystal display modules, to avoid interference and enhance accuracy of calculation when the receiver 106 respectively receives the reference light Lm and the reflected light Lr. Moreover, the present invention utilizes the receiver 106 to receive the optical signal and output the electronic signal to the control unit 108, and the control unit 108 compares the electronic signal and the predetermined value, to determine whether the electronic signal is saturated. If the electronic signal is larger than the predetermined value, the control unit 108 adjusts the transmittance of the liquid crystal display modules to decrease the intensity of the measuring light Ls, and thereby the receiver 106 can output an appropriate reflected signal, so as to accurately calculate the distance from the target based on the phase difference of the optical signal. Since the present invention utilizes the liquid crystal display modules, the present invention only needs a small control signal to control the measuring light Ls to pass through or be blocked, so as to decrease the power consumption and noise. Moreover, since volume of the liquid crystal display modules is small, the volume of the apparatus can be reduced. In addition, when a target is a substance with high reflectivity or at a short distance, by setting the transmittance of the liquid crystal display modules, the receiver 106 will not be saturated due to high light intensity. Thus, range of measurement is increased and variable distances of measurable targets.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A laser distance measuring apparatus for measuring a distance from a target comprising:
    an emitter, to emit measuring light;
    a first liquid crystal display module, comprising a second state and a first state;
    a second liquid crystal display module, comprising a second state and a first state;
    a receiver, to receive the reference light passing through the second liquid crystal display module by the measuring light, and a reflected light reflected from the target by the measuring light, and outputting a reference signal and a reflected signal based on intensity of the reference light and the reflected light; and
    a control unit, to set the first liquid crystal display module to the first state and the second liquid crystal display module to the second state, set the first liquid crystal display module to the second state and the second liquid crystal display module to the first state in order to receive the reference signal, compare the reflected signal and a predetermined value, and decrease a transmittance of the first liquid crystal display module when the reflected signal is larger than the predetermined value.

2. The laser distance measuring apparatus of claim 1, wherein the control unit further comprises:
    decreasing the transmittance of the first liquid crystal display module until the reflected signal is lower than the predetermined value; and calculating a distance value based on phase difference between the reference light and the reflected light.

3. The laser distance measuring apparatus of claim 1 further comprising:
    a first driving unit, to set the second state and the first state of the first liquid crystal display module;
    a second driving unit, to set the second state and the first state of the second liquid crystal display module; and
    a condensing lens, to condense the reflected light to the receiver.

4. The laser distance measuring apparatus of claim 3, wherein the first driving unit and the second driving unit sets the second state, the first state, and the transmittance of the first liquid crystal display module and the second liquid crystal display module controlled by the control unit.

5. The laser distance measuring apparatus of claim 1, wherein the condensing lens is a convex lens or an aspheric lens.

6. The laser distance measuring apparatus of claim 3, wherein the condensing lens is a simple lens or a combined lens.

7. The laser distance measuring apparatus of claim 1, wherein the condensing lens is a lens module.

8. The laser distance measuring apparatus of claim 1, wherein the emitter is a laser module.

9. The laser distance measuring apparatus of claim 1, wherein the receiver is an avalanche photodiode (APD).

10. The laser distance measuring apparatus of claim 1, wherein the driving unit is a liquid crystal display module driving integrated circuit (IC).

11. The laser distance measuring apparatus of claim 1, wherein the control unit is a microcontroller unit (MCU), a complex programmable logic device (CPLD), or a filed programmable gate array (FPGA).

12. The laser distance measuring apparatus of claim 1, wherein the first state is a non-transparant state, and the second state is a transparent state.

13. A method for controlling a laser distance measuring apparatus for measuring a distance from a target, which comprises an emitter, a first liquid crystal display module, a second liquid crystal display module, a receiver and a control unit, and emits a measuring light to the target when the laser distance measuring apparatus performs measurement, comprising:
    setting the first liquid crystal display module to a first state, and setting the second liquid crystal display module to a second state;
    receiving the reference light passing through the second liquid crystal display module by a the measuring light;
    setting the first liquid crystal display module to the second state and the second liquid crystal display module to the first state after the reference light is received;
    receiving the reflected light reflected from the target by the measuring light; and
    comparing whether an intensity of the reflected light is larger than a predetermined value, calculating a distance value if the intensity of the reflected light is lower than the predetermined value, and decreasing a transmittance of the first liquid crystal display module until the intensity of the reflected light is lower than the predetermined value if the intensity of the reflected light is larger than the predetermined value, and calculating the distance value.

14. The method of claim 13, wherein the laser distance measuring apparatus further comprises a first driving unit and a second driving unit, and setting the first liquid crystal display module to a second state and the second liquid crystal display module to a first state further comprises the control unit controlling the first driving unit to set the first liquid crystal display module to a first state and controlling the second driving unit to set the second liquid crystal display module to a second state.

15. The method of claim 13, wherein the reference light which is the measuring light passing through the second liquid crystal display module is received by the receiver.

16. The method of claim 15, wherein the receiver outputs a reference signal based on the intensity of the reference light.

17. The method of claim 16, wherein comparing whether the intensity of the reflected light is larger than the predetermined value from the reference signal and the predetermined value by the control unit.

18. The method of claim 13, wherein the first state is a non-transparant state, and the second state is a transparent state.

* * * * *